United States Patent
Koganezawa et al.

(10) Patent No.: US 7,614,777 B2
(45) Date of Patent: Nov. 10, 2009

(54) LIQUID CRYSTAL DISPLAY DEVICE

(75) Inventors: Nobuyuki Koganezawa, Chiba (JP);
Akiyoshi Tobe, Mobara (JP)

(73) Assignees: Hitachi Displays, Ltd., Chiba-ken (JP);
Hitachi Display Devices, Ltd.,
Chiba-ken (JP)

( * ) Notice: Subject to any disclaimer, the term of this patent is extended or adjusted under 35 U.S.C. 154(b) by 0 days.

(21) Appl. No.: 11/729,777

(22) Filed: Mar. 30, 2007

(65) Prior Publication Data
US 2007/0236957 A1  Oct. 11, 2007

(30) Foreign Application Priority Data
Apr. 10, 2006  (JP) .............................. 2006-107127

(51) Int. Cl.
*F21V 7/04* (2006.01)
(52) U.S. Cl. ..................... 362/620; 362/613; 362/626
(58) Field of Classification Search ................ 362/625, 362/626, 328, 333, 336, 339, 355, 561, 559, 362/600, 612, 613, 620, 623; 349/65, 62; 359/599; 385/901
See application file for complete search history.

(56) References Cited

U.S. PATENT DOCUMENTS

| | | | | |
|---|---|---|---|---|
| 6,582,095 | B1 * | 6/2003 | Toyoda ........................ | 362/235 |
| 6,609,809 | B2 * | 8/2003 | Ohkawa ....................... | 362/626 |
| 6,669,350 | B2 * | 12/2003 | Yamashita et al. ........... | 362/612 |
| 6,676,268 | B2 * | 1/2004 | Ohkawa ....................... | 362/613 |
| 6,733,147 | B2 * | 5/2004 | Wang et al. .................. | 362/26 |
| 6,746,129 | B2 * | 6/2004 | Ohkawa ....................... | 362/625 |
| 6,761,461 | B2 * | 7/2004 | Mizutani et al. ............ | 362/600 |
| 6,791,638 | B2 * | 9/2004 | Miyashita et al. ........... | 349/65 |
| 7,121,709 | B2 * | 10/2006 | Shinohara et al. .......... | 362/606 |
| 2004/0136077 | A1 * | 7/2004 | Leu et al. .................... | 359/599 |

FOREIGN PATENT DOCUMENTS

JP  2005331565 A  * 12/2005

* cited by examiner

*Primary Examiner*—Hargobind S Sawhney
(74) *Attorney, Agent, or Firm*—Stites & Harbison PLLC; Juan Carlos A. Marquez, Esq.

(57) ABSTRACT

The present invention provides a liquid crystal display device of high quality having high brightness and uniform brightness distribution by focusing the light radiation direction from a light guide plate in the vertical direction with respect to a light radiation surface of the light guide plate. The liquid crystal display device includes a liquid crystal display panel and a flat lighting device which radiates an illumination light to a back surface of the liquid crystal display panel. The flat lighting device includes a light guide plate which has an upper surface facing a back surface of the liquid crystal display panel in an opposed manner and constituting a light radiation surface and a bottom surface which is arranged opposite to the upper surface. One LED is arranged at a first corner portion of the light guide plate and another LED is arranged at a second corner portion of the light guide plate arranged adjacent to the first corner portion. By forming reflection surfaces which are inclined toward the upper surface from the bottom surface of the light guide plate and inclined surfaces which abut on the reflection surfaces on the lower surface of the light guide plate, the light radiation direction from the light guide plate is focused in the vertical direction with respect to the upper surface of the light guide plate.

6 Claims, 12 Drawing Sheets

LIQUID CRYSTAL DISPLAY DEVICE

BACKGROUND OF THE INVENTION

1. Field of the Invention

The present invention relates to a non-self-luminous display device, and more particularly to a liquid crystal display device having a flat lighting device which includes a light guide plate on a back surface of a liquid crystal display panel and uses a light emitting element as a light source. To be more specific, the present invention relates to the light diffusion structure of the light guide plate.

2. Background Art

Recently, the liquid crystal display device has been popularly used as a display device. Particularly, the liquid crystal display device is used as a display part of portable equipment because of a reduced thickness, a reduced weight and low electric power consumption.

However, the liquid crystal display device is not self-luminous and hence, the display device requires an illumination means. In general, as an illumination device which is used for the liquid crystal display device, a flat lighting device referred to as a backlight is popularly used. Conventionally, although a cold cathode fluorescence lamp has been used as a light emitting element of the backlight, an LED has been also recently used as the light emitting element in the portable equipment.

The backlight usually includes a plate-like light guide plate. The light guide plate is made of a light-transmissive resin material, and light which is incident on the light guide plate from a light emitting element pass through the inside of the light guide plate. Reflection members, light diffusion members or the like such as grooves or projections are formed on the light guide plate, and the light which passes through in the inside of the light guide plate is radiated toward a back surface of a liquid crystal display panel by the reflection members or the light diffusion members.

For example, JP-A-2005-331565 or the like proposes a liquid crystal display device which uses LEDs as light emitting elements, arranges a plurality of LEDs on a plurality of corner portions of a light guide plate, and forms concentric arcuate inclined surfaces about the LEDs which reflect the light on the light guide plate.

SUMMARY OF THE INVENTION

However, in the backlight which uses a plurality of LEDs for increasing the brightness as the light emitting element, a plurality of light emitting points exist and hence, positions and shapes of members which reflect and radiate the light passing through the inside of the light guide plate become complicated. Particularly, when the LEDs are arranged at the corner portions of the light guide plate in consideration of spreading of the light radiated from the LEDs, there has been a drawback that it is difficult to set an angle of a reflection surface of one reflection member so as to reflect the light from two directions toward a radiation surface side.

Accordingly, the present invention has been made to overcome the above-mentioned conventional drawback, and it is an object of the present invention to provide a liquid crystal display device which can obtain a display image of high quality with the acquisition of high brightness and uniform brightness distribution of by focusing the light radiation direction from a light guide plate in the vertical direction with respect to a light radiation surface of the light guide plate.

To achieve the above-mentioned object, according to the present invention, there is provided a liquid crystal display device which includes a liquid crystal display panel which is configured such that a liquid crystal layer is sandwiched between a pair of transparent substrates which have electrodes for forming pixels on an inner surface of the transparent substrate, and a backlight which radiates an illumination light to the back surface of the liquid crystal panel, wherein the backlight includes light emitting elements, a light guide plate on which light is incident from the light emitting elements, a first inclined surface which is arranged to face the light emitting elements formed on the light guide plate, and a second inclined surface which is brought into contact with the first inclined surface.

The liquid crystal display device according to the present invention may preferably be configured such that, in the above-mentioned constitution, the light radiation direction of the light from the light guide plate is focused in the vertical direction with respect to a light radiation surface by setting the first inclined surface and the second inclined surface to a value which falls within a range of 45° to 65° with respect to a bottom surface of the light guide plate.

According to the present invention, by focusing the light radiation direction from the light guide plate in the vertical direction with respect to the light radiation surface, a light utilization efficiency can be largely enhanced whereby high brightness and uniform brightness distribution of light can be obtained. Accordingly, it is possible to achieve an advantageous effect to realize a liquid crystal display device of high display quality.

BRIEF DESCRIPTION OF THE DRAWINGS

FIG. 2A and FIG. 2B are views showing the schematic structure of a LED of the liquid crystal display device, wherein FIG. 2A is a cross-sectional view of the LED, and FIG. 2B is a plan view of a light emitting surface side of the LED;

FIG. 3A and FIG. 3B are views showing the schematic constitution of a light guide plate, wherein FIG. 3A is a plan view of the light guide plate, and FIG. 3B is a side view of the light guide plate;

FIG. 4A and FIG. 4B are schematic cross-sectional views showing the propagation of light in the inside of the light guide plate, wherein FIG. 4A is a view showing an existing light propagation state, and FIG. 4B is a view showing a light propagation state of the embodiment according to the present invention;

FIG. 13 is measured in the light guide plate.

DETAIL DESCRIPTION OF THE EMBODIMENTS

The present invention is explained in detail in conjunction with specific embodiments using drawings showing the embodiments hereinafter.

Figure 1:
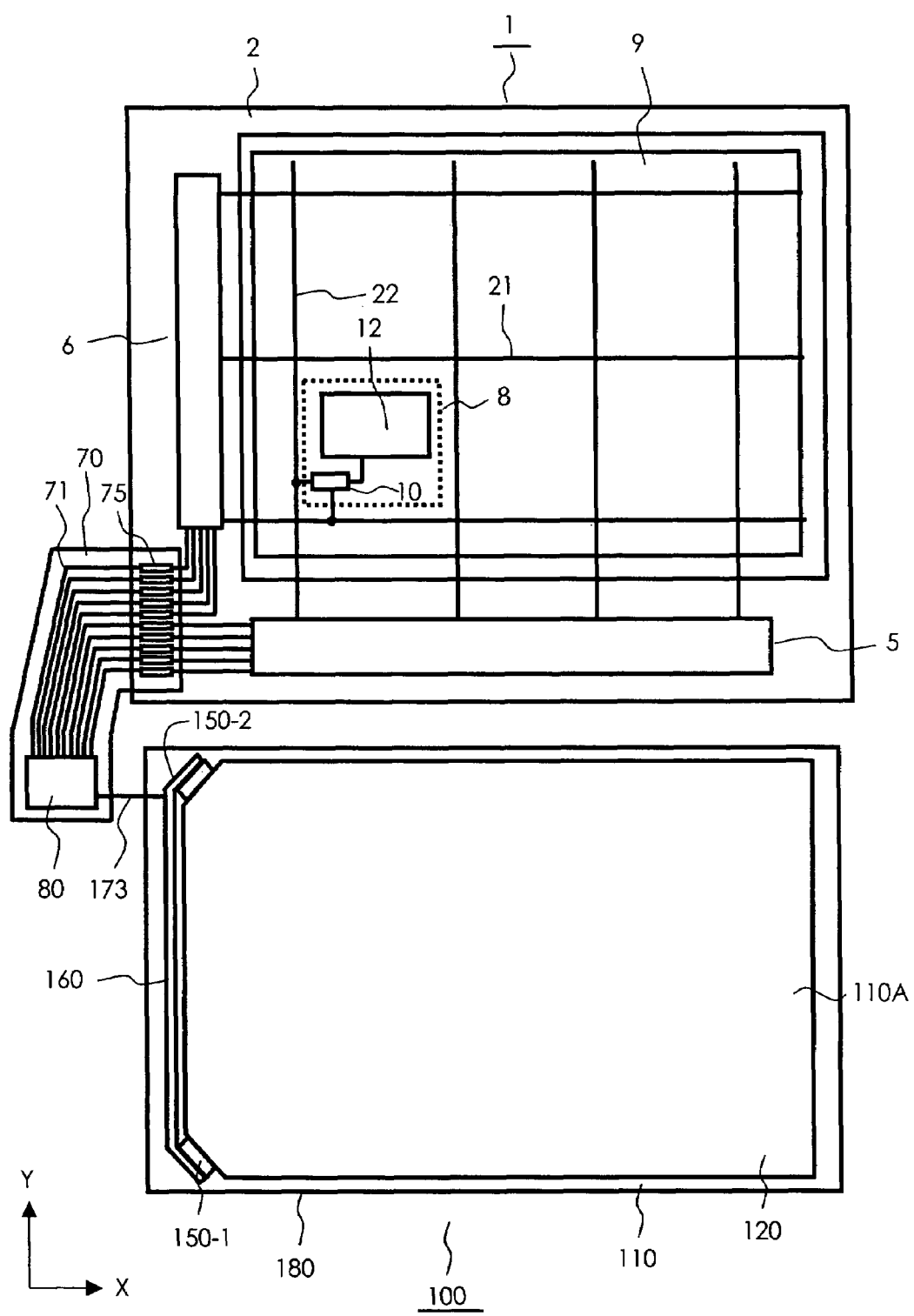
FIG. 1 is a plan view showing the schematic constitution of a liquid crystal display device of an embodiment according to the present invention.

FIG. 1 is a plan view of an essential part showing the whole constitution according to one example of a liquid crystal display device of the present invention. In FIG. 1, the liquid crystal display device 100 is constituted of a liquid crystal display panel 1, a backlight 110 and a control circuit 80. The liquid crystal display panel 1 is formed by sealing a liquid crystal layer between glass substrates having electrodes for forming pixels. Signals and power source voltages necessary for display using liquid crystal are supplied to the liquid crystal display panel 1 from the control circuit 80. The control circuit 80 is mounted on a flexible printed circuit board 70, and control signals are supplied to the liquid crystal display panel 1 via a line 71 and terminals 75 of the flexible printed circuit board 70.

The backlight 110 is constituted of a light guide plate 120, an LED 150 which constitutes a light emitting element and a housing case 180. The backlight 110 is provided for radiating light to the liquid crystal display panel 1. The liquid crystal display panel 1 performs a display by controlling a transmission quantity or a reflection quantity of light radiated from the backlight 110. Further, a flat lighting device 110A is constituted of the light guide plate 120 and the LEDs 150 (LED 150-1, LED 150-2). Here, the backlight 110 is mounted on a back surface side or a front surface side of the liquid crystal display panel 1 in a stacked manner as viewed from a viewer. However, in FIG. 1, to facilitate the understanding of the constitution of the liquid crystal display device, the backlight 110 is illustrated in parallel with the liquid crystal display panel 1.

The light guide plate 120 is formed in a substantially rectangular shape, and the LED 150-1 and the LED 150-2 are arranged at corner portions of the light guide plate 120 which are arranged adjacent to each other respectively. The LED 150-1 and the LED 150-2 which are arranged at the corner portions are electrically connected with each other by a flexible printed circuit board 160, and the flexible printed circuit board 160 is electrically connected with a control circuit 80 via an external connecting line 173. Here, the detailed constitution of the backlight 110 is described later.

Further, a pixel electrode 12 is formed in a pixel portion 8 of the liquid crystal display panel 1. Here, the liquid crystal display panel 1 includes a large number of the pixel portions 8 in a matrix array. However, to avoid the drawing from becoming cumbersome, in FIG. 1, only one pixel portion 8 is illustrated. The pixel portions 8 which are arranged in a matrix array form a display region 9, and the respective pixel portions 8 assume the role of pixels of a display image and display an image on the display region 9.

In FIG. 1, in the drawing, gate signal lines (also referred to as scanning signal lines) 21 which extend in the X direction and are arranged in parallel in the Y direction and drain signal lines (also referred to as video signal lines) 22 which extend in the Y direction and are arranged in parallel in the X direction are provided, and the pixel portions 8 are formed in regions which are surrounded by the gate signal lines 21 and the drain signal lines 22.

A switching element 10 is provided to the pixel portion 8. The control signal is supplied to the pixel portion 8 from the gate signal lines 21 so as to control an ON/OFF state of the switching element 10. When the switching element 10 is turned on, the video signal which is transmitted via the drain signal line 22 is supplied to the pixel electrode 12.

The drain signal lines 22 are connected to a drive circuit 5 and video signals are outputted to the drain signal lines 22 from the drive circuit 5. The gate signal lines 21 are connected to a drive circuit 6 and control signals are outputted to the gate signal lines 21 from the drive circuit 6. Here, the gate signal lines 21, the drain signal lines 22, the drive circuit 5 and the drive circuit 6 are formed on the same TFT substrate 2.

Figure 2A:
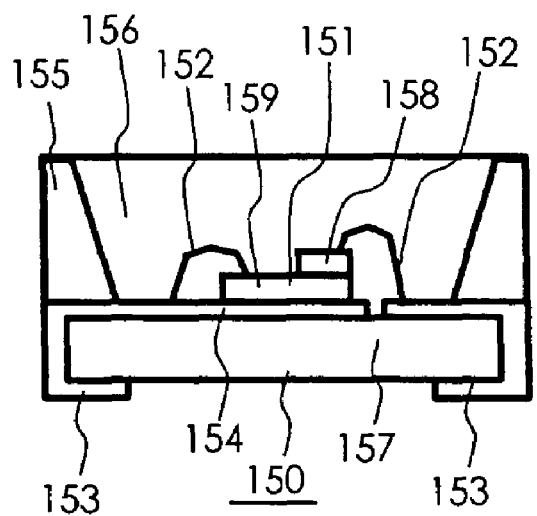
Figure 2B:
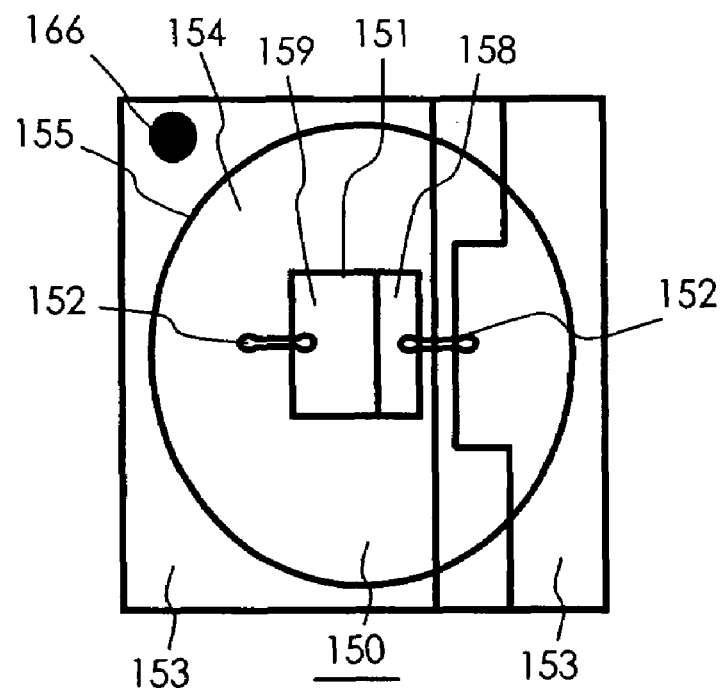

FIG. 2A and FIG. 2B are views showing the schematic constitution of the LED 150, wherein FIG. 2A is a schematic cross-sectional view of the LED 150, and FIG. 2B is a plan view of a light emitting surface side of the LED 150. The LED 150 shown in FIG. 2 has the structure which mounts an LED chip 151 constituting a light emitting portion on a chip substrate 157. The LED chip 151 has a pn junction and light having a specific wavelength is radiated when a voltage is applied to the pn junction. A p electrode (anode) 158 is formed on a p-type semiconductor layer which forms the pn junction, and an n electrode (cathode) 159 is formed on an n-type semiconductor layer which forms the pn junction.

Wires 152 are connected to the p electrode 158 and the n electrode 159 respectively. With these wires 152, chip terminals 153 which are provided for connecting the LED 150 and the outside are electrically connected with the p electrode 158 and the n electrode 159.

A fluorescent light emitting portion 156 may be formed on the light radiation surface side of the LED chip 151. The fluorescent light emitting portion 156 has a function of converting a wavelength of light which is emitted from the LED chip 151. Here, numeral 155 indicates a corn-shaped reflection surface which reflects light advancing in the lateral direction to the light radiation surface side. Numeral 166 indicates a mark indicative of a position of a cathode (or an anode).

While the chip terminals 153 are connected with external lines or the like on a back surface of the chip substrate 157, the chip terminals 153 extend to the light radiation surface side from the back surface of the chip substrate 157 by way of side surfaces of the chip substrate 157 and form a chip mounting portion 154. By forming the chip terminals 153 and the chip mounting portion 154 using metal which exhibits high optical reflectance, it is possible to make use of the chip mounting portion 154 as a light reflection surface. Further, by forming the chip terminals 153 and the chip mounting portion 154 using metal (also an electricity conductive material) which exhibits high heat conductivity, it is possible to radiate heat generated by the LED chip 151 to a back surface side of the chip substrate 157.

Figure 3A:
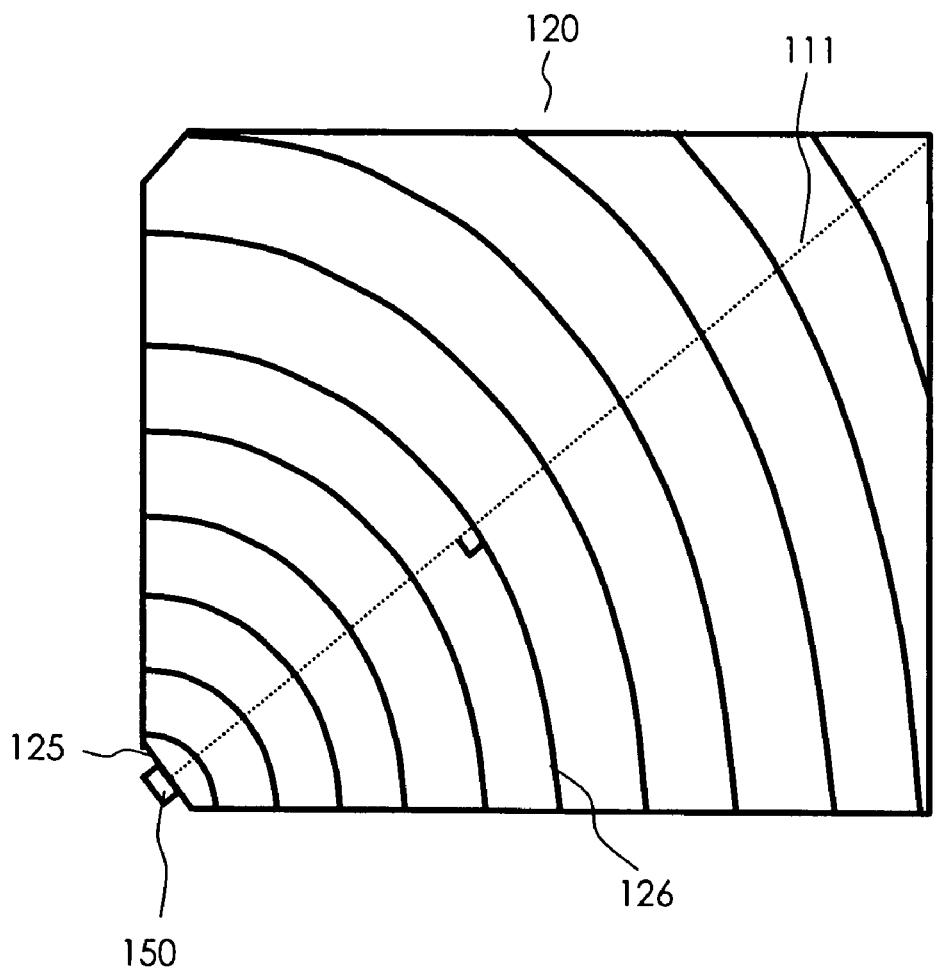
Figure 3B:
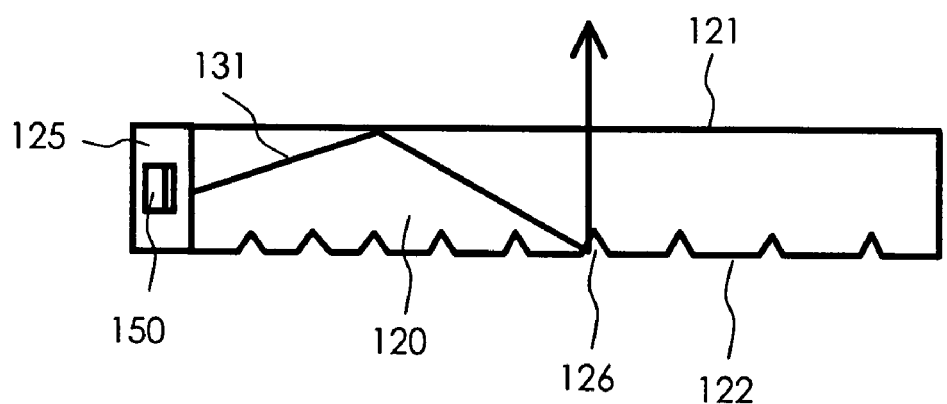

FIG. 3A and FIG. 3B are views showing the schematic constitution of the light guide plate 120, wherein FIG. 3A is a plan view of the light guide plate 120, and FIG. 3B is a side view as viewed from a side surface of the light guide plate 120. As shown in FIG. 3A, the light guide plate 120 is formed in a rectangular shape and includes an upper surface 121 which forms a light radiation surface and a lower surface 122 which is arranged opposite to the upper surface 121 and forms a bottom surface. Further, the light guide plate 120 is made of a material such as an acrylic resin which allows light to pass therethrough. As shown in FIG. 3B, the light guide plate 120 is formed in a plate shape and has a thickness of approximately 1.0 mm to approximately 0.4 mm. Here, although the light guide plate 120 has a rectangular cross section in FIG. 3B, the light guide plate 120 may have a wedge-shaped cross section which reduces a plate thickness thereof from a light incident surface 125 side.

FIG. 3A and FIG. 3B show the structure in which one LED 150 is mounted on the light incident surface 125 formed on a corner portion of the light guide plate 120 for explaining the direction that the light is reflected. Further, the upper surface 121 and the lower surface 122 are arranged to be orthogonal with respect to the light incident surface 125, and reflection portions are formed of a groove 126 having a V-shaped cross section.

The light (beams) which is radiated from the LED 150 is incident on the light guide plate 120 from the light incident surface 125 formed on the corner portion. The light 131 which is incident on the light guide plate 120 propagates in the light guide plate 120 while repeating the total reflection between the upper surface 121 and the lower surface 122. The grooves 126 are formed in the lower surface 122 and the light 131 is reflected toward the upper surface 121 side by the grooves 126.

As shown in FIG. 3A, the grooves 126 are concentrically formed about the LED 150. Arcs which the grooves 126 form are arranged orthogonal to an imaginary straight line 111 which extends from the LED 150 and hence, the grooves 126 are also arranged orthogonal to the light which advances straightly from the LED 150.

Figure 4A:
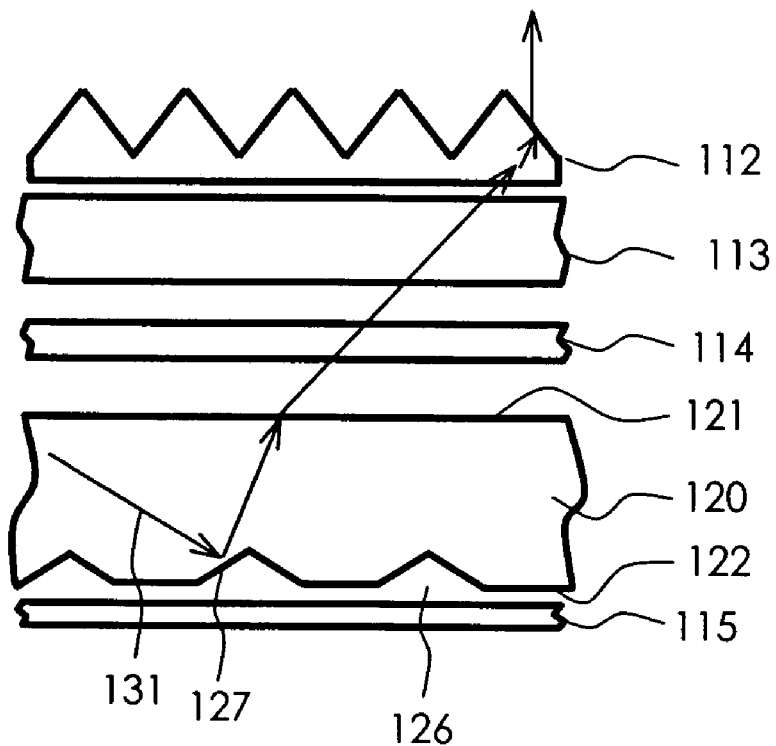
Figure 4B:
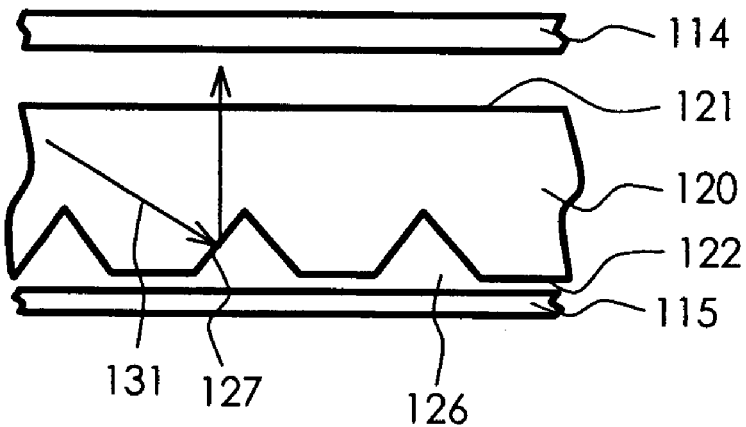

FIG. 4A and FIG. 4B are schematic cross-sectional views for explaining the structure for propagating the light 131 in the inside of the light guide plate 120, wherein FIG. 4A shows the existing light propagation structure, and FIG. 4B shows the light propagation structure of the embodiment according to the present invention. In the existing example shown in FIG. 4A, a reflection surface (also referred to as an inclined surface) 127 of the groove 126 makes an angle of approximately 5 degrees to approximately 35 degrees with respect to the lower surface 122 and hence, the light which is reflected on the reflection surface 127 is radiated while expanding outwardly with a large angle with respect to the vertical direction of the upper surface 121 of the light guide plate 120 (an obtuse angle with respect to the upper surface 121).

Accordingly, on the light guide plate 120, a prism sheet 113 and a prism sheet 112 are formed to reflect the light which advances to the outside to a liquid crystal display panel (not shown in the drawing) side. Here, numeral 114 indicates a diffusion plate and numeral 115 indicates a reflection sheet.

To the contrary, in the light guide plate 120 shown in FIG. 4B, the reflection surface 127 is formed to make an angle of approximately 50 degrees±10 degrees with respect to the lower surface 122 and hence, the radiation light from the upper surface 121 is arranged substantially vertical direction with respect to the upper surface 121.

Figure 5:
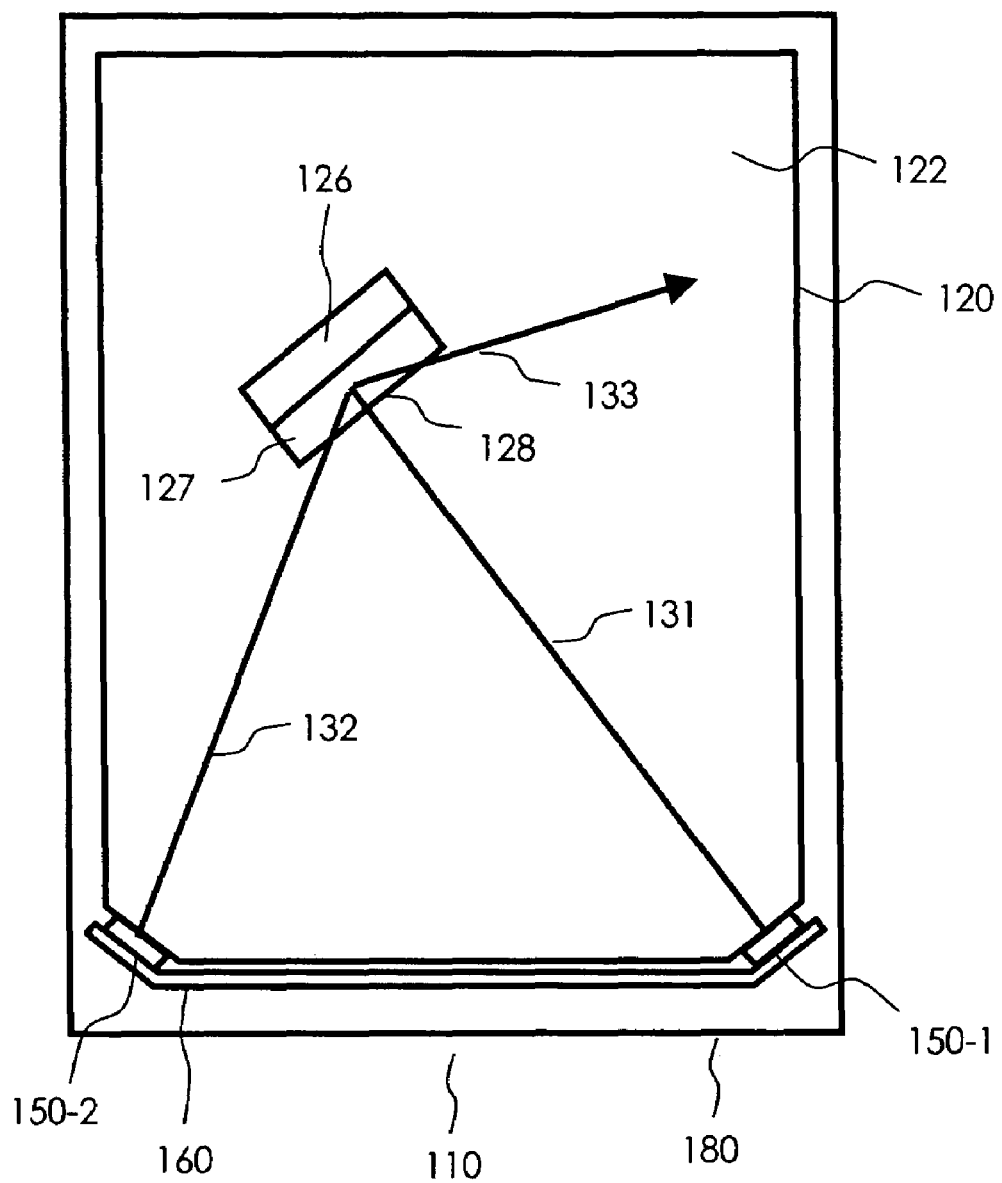
FIG. 5 is a schematic plan view showing drawbacks when a plurality of light emitting elements are used for the liquid crystal display device.

However, as shown in FIG. 5 which is the plan view of the light guide plate 120, the light 131 which is incident to be orthogonal with respect to a tangent line 128 between the reflection surface 127 and the lower surface 122 is radiated in the vertical direction with respect to the upper surface (paper surface in FIG. 5) 121. However, the light 132 which is not arranged orthogonal to the tangent line 128 is reflected in the direction toward the outside of the light guide plate 120.

In FIG. 3A and FIG. 3B, one LED 150 is used and hence, it is possible to arrange the tangent line 128 orthogonal to the light from the LED 150 by forming the grooves 126 concentrically about the LED 150. However, as shown in FIG. 5, when the LED 150-1 and the LED 150-2 are arranged at corner portions of the light guide plate 120 thus using the plurality of light emitting elements, it is found difficult to form the grooves 126 such that lines which connect the plurality of light emitting elements and the grooves 126 become orthogonal to the tangent line 128.

Figure 6:
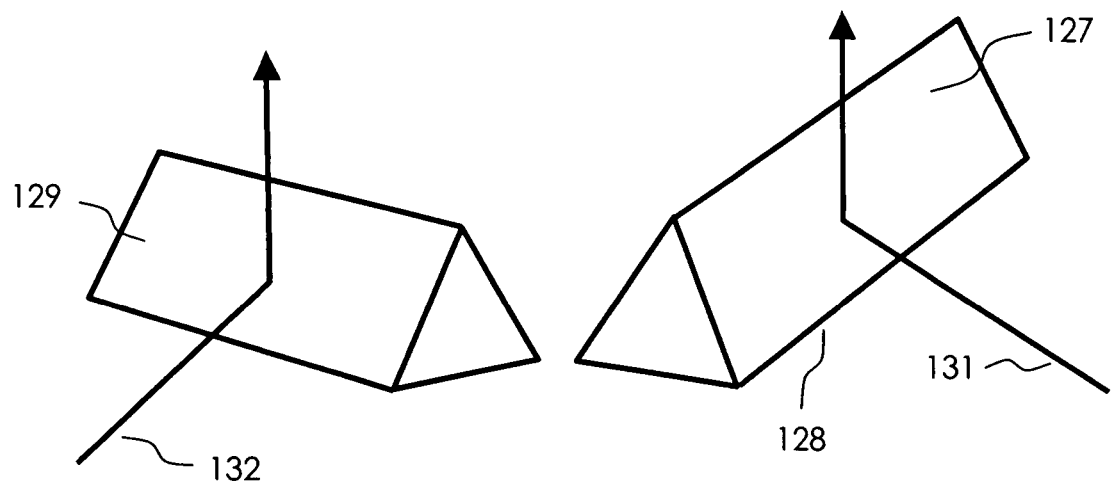
FIG. 6 is a schematic perspective view showing drawbacks when a plurality of light emitting elements are used for the liquid crystal display device.

Further, to explain this situation using FIG. 6, the inclined surface 127 is an inclined surface which reflects the light 131 from the LED 150-1 in the extending direction with respect to the upper surface (radiation surface) 121 of the light guide plate 120, while the inclined surface 129 is an inclined surface which reflects the light 132 from the LED 150-2 in the extending direction with respect to the upper surface 121 of the light guide plate 120.

Since the inclined surface 127 and the inclined surface 129 are formed adjacent to each other, different surfaces become necessary for reflecting the lights from the different directions in the same direction. In this manner, it is difficult to radiate the light 131 from the LED 150-1 and the light 132 from the LED 150-2 in the vertical direction from the light guide plate 120 using one inclined surface formed on one point in the inside of the light guide plate 120.

Figure 7:
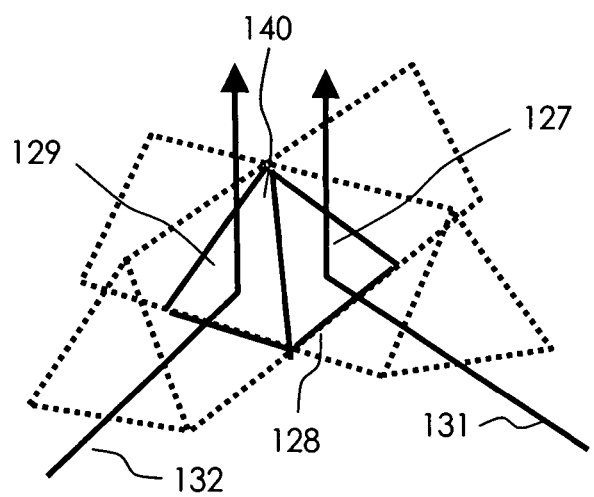
FIG. 7 is a schematic perspective view showing inclined surfaces.

Accordingly, as shown in FIG. 7, by forming pyramids 140 in which the inclined surfaces 127 and the inclined surfaces 129 are formed in an intersecting manner on the light guide plate 120, the light 131 from the LED 150-1 and the light 132 from the LED 150-2 are reflected to be directed in the same direction.

Here, the constitution which reflects the light 131 from the LED 150-1 and the light 132 from the LED 150-2 such that these lights 131, 132 advance in the same direction is not limited to the pyramid. That is, any shape which can make the inclined surface 127 and the inclined surface 129 intersect with each other in an adjacent manner may bring about the substantially same advantageous effect.

As shown in FIG. 7, with the use of the pyramids 140 which are formed in a state that the inclined surfaces 127 and the inclined surfaces 129 intersect each other, it is possible to reflect the light 131 from the LED 150-1 and the light 132 from the LED 150-2 such that these lights 131, 132 advance in the same direction. However, areas of the inclined surface 127 and the inclined 129 of the pyramid 140 are reduced compared to areas of the inclined surface 127 and the inclined 129 shown in FIG. 6.

Between the constitution shown in FIG. 6 and the constitution shown in FIG. 7 differ from each other in the length of the tangent line 128 made by the inclined surface 127 and the lower surface 122. However, even assume the inclined surfaces 127 having the same tangent line 128, while the inclined surface 127 shown in FIG. 6 have a quadrangular shape, the inclined surface shown in FIG. 7 has a triangular shape and hence, the area is reduced.

In this manner, although the pyramid 140 shown in FIG. 7 may reduce a quantity of light which are reflected on the inclined surface 127 and the inclined surface 129, the pyramid 140 is configured to reflect lights from the plurality of directions in the same direction. However, since the quantity of reflection light is reduced, it is necessary to set the size and the arrangement density of the pyramids 140 to proper values to prevent the reduction of the quantity of reflection light.

Figure 8:
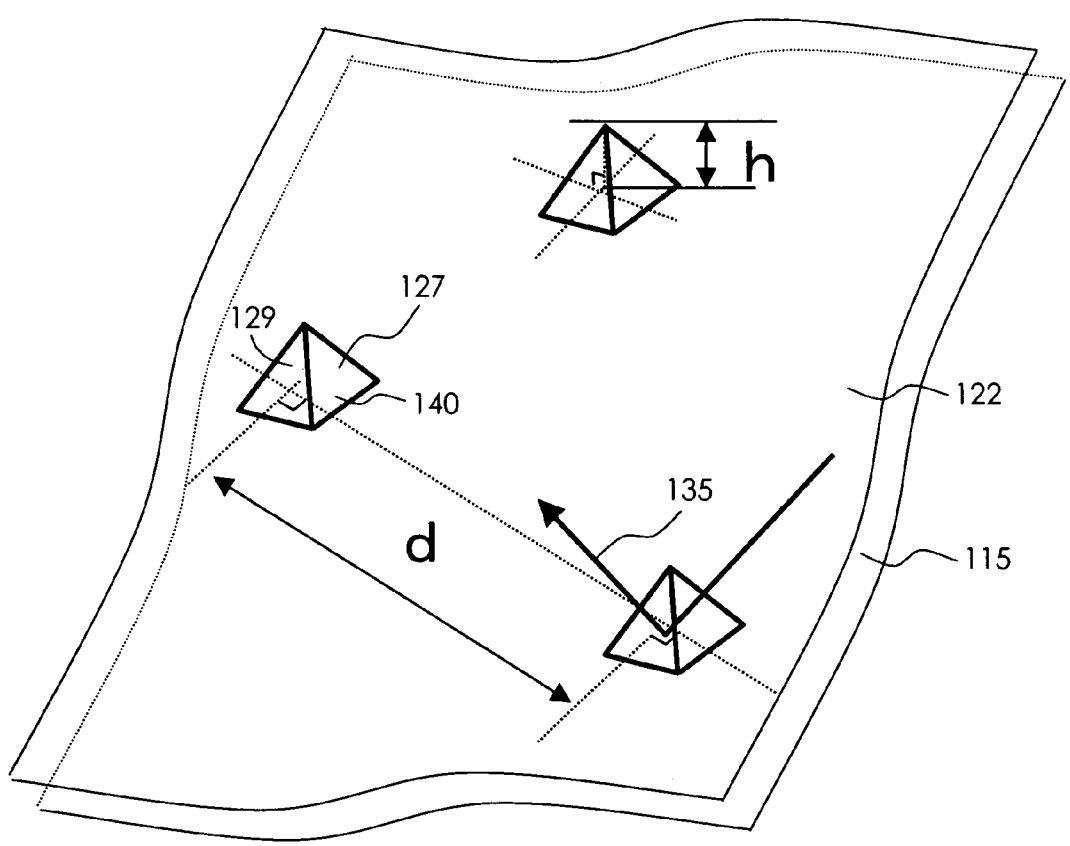
FIG. 8 is a schematic perspective view showing reflection members.

FIG. 8 shows the arrangement of the pyramids 140 which are formed on the bottom surface 122 of the light guide plate 120. When a thickness of the light guide plate 120 falls within a range from approximately 1.0 mm to approximately 0.4 mm, a height "h" of the pyramid 140 is approximately 10 μm±5 μm and a distance "d" between the pyramids 140 is approximately 200 μm±50 μm.

As shown in FIG. 8, the pyramids 140 are formed in a scattered manner with the fixed distance "d". Among lights which pass through the light guide plate 120, as in the case of the light 134, there exist the lights which pass through the inclined surfaces 127 or the inclined surface 129, are reflected on the reflection sheet 115 arranged below the bottom surface 122, and return to the light guide plate 120 again. Accordingly, it is desirable that surfaces which face the inclined surface 127 and the inclined surface 129 also have the substantially same inclined angles as the inclined surface 127 and the inclined surface 129.

Figure 9:
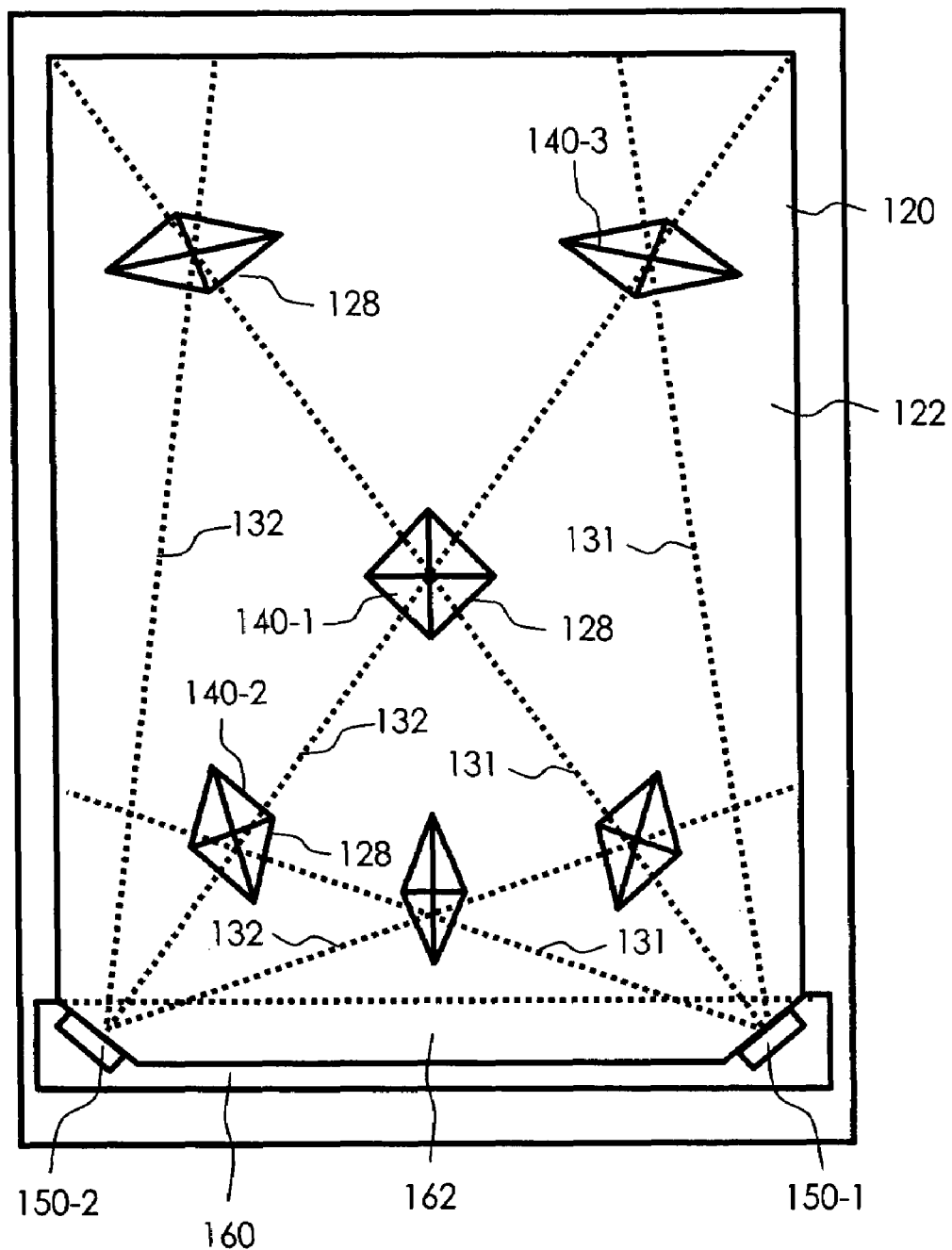
FIG. 9 is a schematic plan view showing a light guide plate.

Next, the shape of the pyramids 140 is explained using FIG. 9. As shown in FIG. 9, since the pyramids 140 are arranged such that the pyramid 140 forms the tangent line 128 orthogonal to the light 131 from the LED 150-1 and the light 132 from the LED 150-2, the quadrangular shape (hereinafter referred to as bottom peripheral portion) which the tangent lines between the pyramid 140 and the bottom surface 122 form is not fixed and is deformed based on a distances from the LED 150-1 and the LED 150-2 and angles with respect to the LED 150-1 and the LED 150-2.

The bottom peripheral portion of the pyramid 140-1 which is formed in the vicinity of the center of the light guide plate 120 is close to the approximately square shape, the bottom peripheral portion of the pyramid 140-2 which is arranged closer to the LED 150-2 than the pyramid 140-1 formed in the vicinity of the center of the light guide plate 120 is formed in a longitudinally elongated shape inclined toward the LED 150-2 side, and the bottom peripheral portion of the pyramid 140-3 at a position diagonally remoter from the LED 150-2 than the pyramid 140-1 formed in the vicinity of the center of the light guide plate 120 is formed in a laterally elongated shape deeply inclined toward the LED 150-2 side.

Here, on a line which connects the LED 150-1 and the LED 150-2, a region 162 in which the pyramid 140 is not formed may be provided thus preventing light from being radiated from the light guide plate 120 in the region 162. Further, a flexible printed circuit board 160 may be arranged below the region 162 in an overlapped manner.

Figure 10:
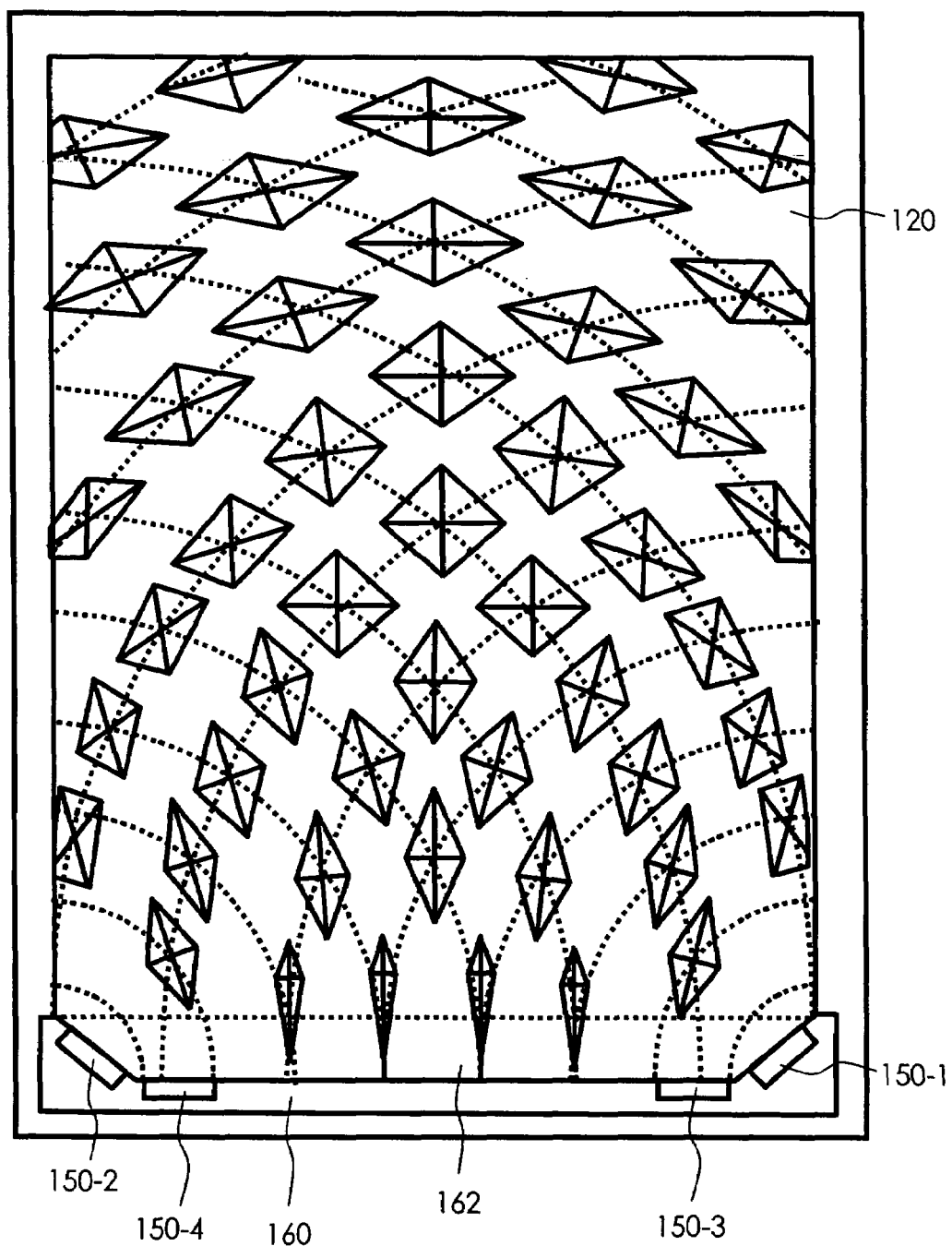
FIG. 10 is a schematic plan view showing the light guide plate.

FIG. 10 shows the light guide plate 120 which forms the pyramids 140 at positions where the concentric circles about the LED 150-1 and the concentric circles about the LED 150-2 intersect each other thereon. FIG. 10 shows a case in which four light emitting elements are formed in a state that the LED 150-3 and the LED 150-4 are arranged respectively adjacent to the LED 150-1 and the LED 150-2 mounted on two corner portions of the light guide plate 120. Further, the pyramids 140 formed in the vicinity of the region 162 are formed in a shape that lower sides are shorter than upper sides.

Figure 11:
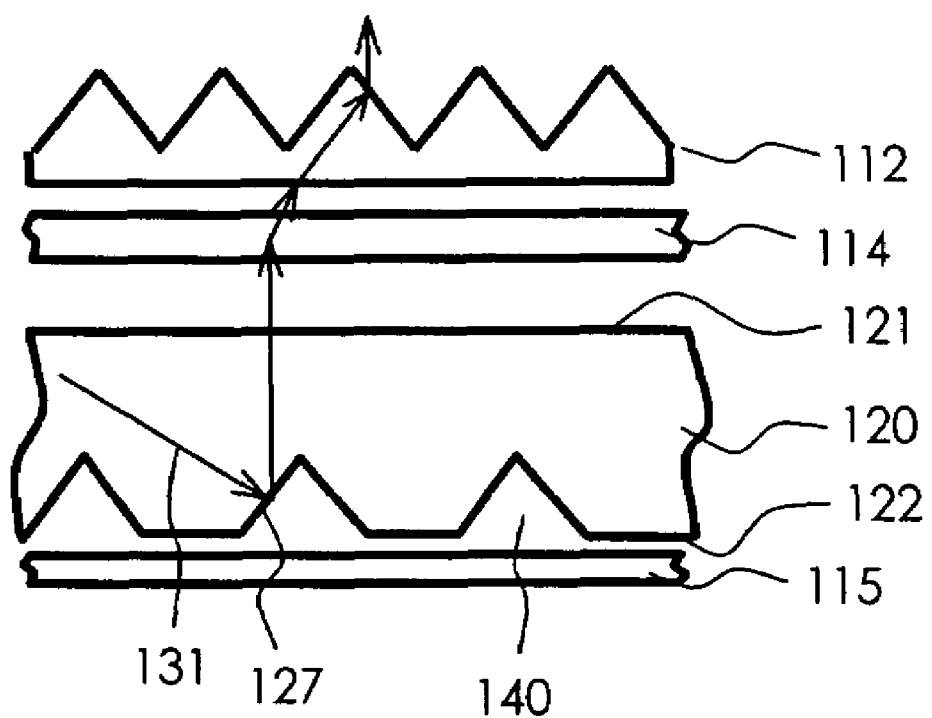
FIG. 11 is a schematic cross-sectional view showing the light guide plate.

Next, FIG. 11 shows the constitution of a variation in which pyramids 140 are formed on a light guide plate 120 and a prism sheet 112 is formed on a diffusion plate 114. Although the radiation light has an angle which spreads from the vertical direction by forming the diffusion plate 114 on the light guide plate 120, with the provision of the prism sheet 112, it is possible to focus the light which is excessively spread toward the vertical direction again.

Figure 12:
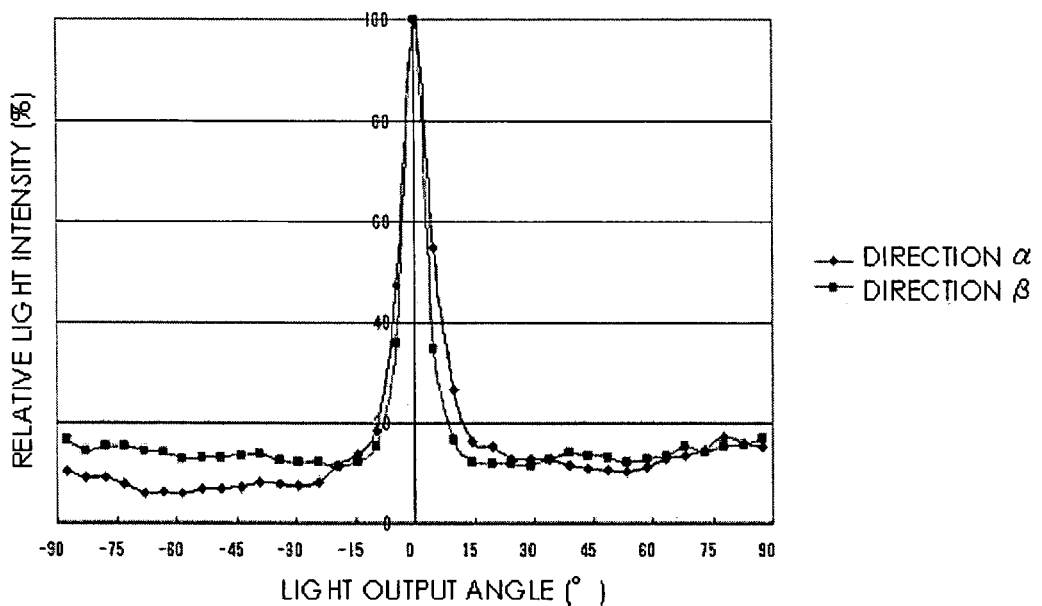
FIG. 12 is a view showing the radiation brightness from the light guide plate.
Figure 13:
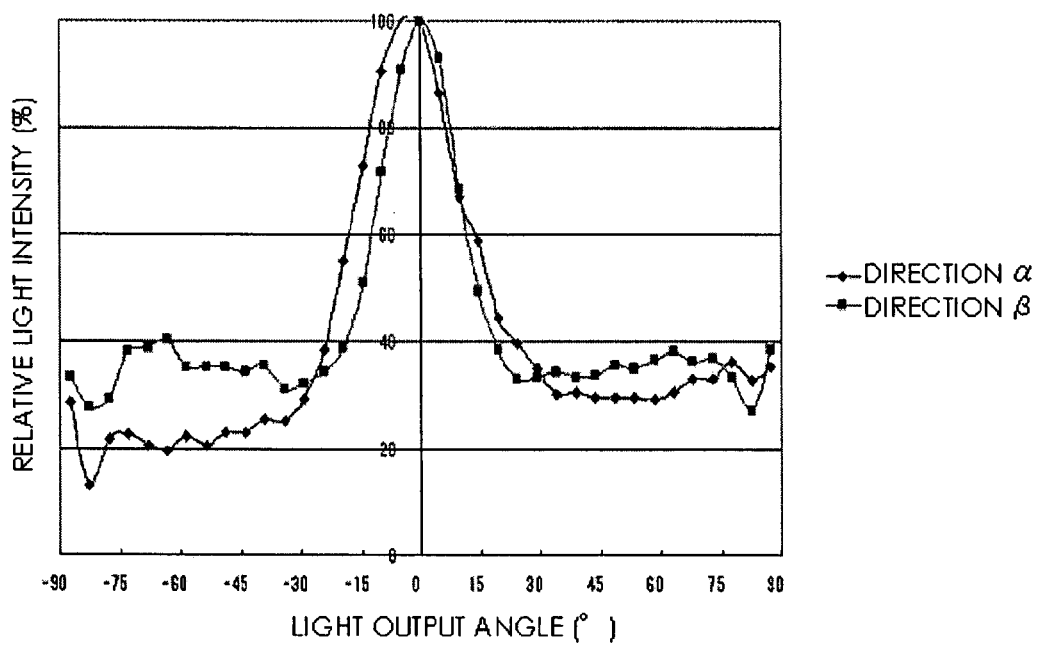
FIG. 13 is a view showing the radiation brightness from the light guide plate.
Figure 14A:
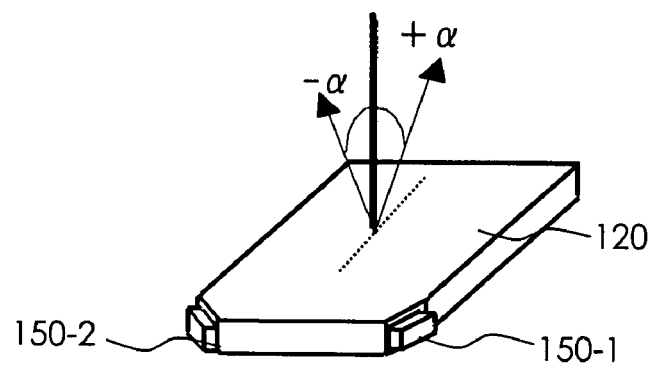
FIG. 14 is a schematic perspective view showing angles at which the radiation brightness shown in FIG. 12
Figure 14B:
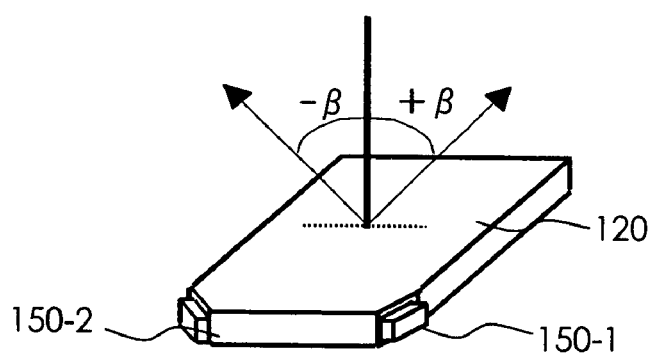

FIG. 12 and FIG. 13 respectively show a result of measurement of intensity of light radiated from the light guide plate 120 from the direction of an angle of $+\alpha$ to $-\alpha$ and the direction of an angle of $+\beta$ to $-\beta$ which are respectively shown in FIG. 14A and FIG. 14B. FIG. 12 shows a case in which the pyramids 140 are formed on the light guide plate 120, while FIG. 13 shows a case in which the pyramids 140 are formed on the light guide plate 120 and, further, the diffusion plate 114 and the prism sheet 112 are formed on the light guide plate 120.

Figure 15:
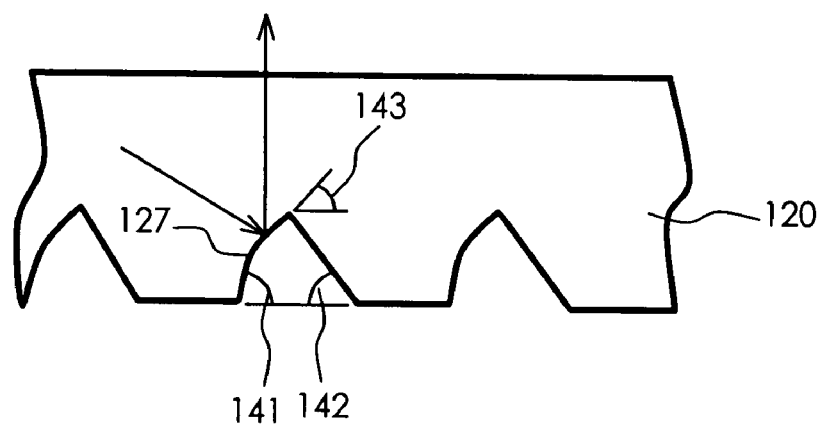
FIG. 15 is a schematic cross-sectional view showing the constitution of the light guide plate.

As shown in FIG. 12, the intensity of light in the vertical direction is increased with respect to the light radiation surface of the light guide plate 120. In FIG. 13, a width of a range in which the intensity of light is increased can be widened. Next, FIG. 15 shows a case in which an inclined surface 127 is formed in a curved surface. An angle 141 is approximately 60 degrees±5 degrees, an angle 142 is approximately 55 degrees±10 degrees, and an angle 143 is approximately 50 degrees±5 degrees. By forming the inclined surface 127 into the curved surface, it is possible to widen the radiation direction of light within a fixed width from the vertical direction.

What is claimed is:

1. A liquid crystal display device comprising:
   a liquid crystal display panel; and
   a backlight which radiates light to the liquid crystal display panel,
   wherein the backlight includes
   a first light source element and a second light source element,
   a light guide plate which allows incidence of light thereon from the first light source element and the second light source element, and
   a plurality of pyramids, each of the plurality of pyramids comprising a first inclined surface and a second inclined surface,
   wherein the first inclined surface is formed on the light guide plate and facing to the first light source element, and
   second inclined surface is formed on the light guide plate and facing to the second light source element, and
   wherein the first inclined surface and the second inclined surface are contacted with each other so as to form two sides of each pyramid,
   a tangent line of the first inclined surface to the light guide plate is orthogonal to the light from the first light source element, and
   a tangent line of the second inclined surface to the light guide plate is orthogonal to the light from the second light source element, and
   wherein a size of the first inclined surface and a size of the second inclined surface increase as a distance from the first light source element and the second source element increases.

2. A liquid crystal display device according to claim 1, wherein inclined angles of the first inclined surface and the second inclined surface are set to values which fall within a range of 55°±10° with respect to a bottom surface of the light guide plate.

3. A liquid crystal display device comprising:
   a liquid crystal display panel; and
   a flat lighting device which radiates light to the liquid crystal display panel,
   wherein the flat lighting device includes
   a light guide plate which has a light radiation surface which faces a back surface of the liquid crystal display panel in an opposed manner and a bottom surface which is arranged opposite to the light radiation surface,
   a first light source element which is arranged at a first corner portion of the light guide plate,
   a second light source element which is arranged at a second corner portion adjacent to the first light emitting element, and
   a plurality of pyramids, each of the plurality of pyramids comprising a first inclined surface and a second inclined surface,
   wherein the first inclined surface is formed on the bottom surface of the light guide plate and is inclined toward the light radiation surface from the bottom surface, the first inclined surface capable of reflecting light from the first light source element toward the light radiation surface, and the second inclined surface is formed on the bottom surface of the light guide plate and is inclined toward the light radiation surface from the bottom surface, the second inclined surface capable of reflecting light from the second light source element toward the light radiation surface, and wherein the first inclined surface and the second inclined surface are contacted with each other so as to form two sides of each pyramid, a line at which the first inclined surface and the second inclined surface are contacted with each other is inclined with respect to the bottom surface, a tangent line of the first inclined surface is orthogonal to the light from the first light source element, and a tangent line of the second inclined surface is orthogonal to the light from the second light source element, and wherein a size of the first inclined surface and a size of the second inclined surface increase as a distance from the first light source element and the second source element increases.

4. A liquid crystal display device according to claim 3, wherein inclined angles of the first inclined surface and the second inclined surface are set to values which fall within a range of 55°±10°.

5. A liquid crystal display device comprising:
a liquid crystal display panel; and
a flat lighting device which radiates light to the liquid crystal display panel,
wherein the flat lighting device includes
a light guide plate which has a light radiation surface which faces the liquid crystal display panel in an opposed manner and a bottom surface which is arranged opposite to the light radiation surface,
a first light emitting element which is arranged at a first corner portion of the light guide plate,
a second light emitting element which is arranged at a second corner portion adjacent to the first light emitting element, and a plurality of pyramids, each of the plurality of pyramids comprising a first inclined surface and a second inclined surface, wherein a first inclined surface is formed on the bottom surface of the light guide plate and is inclined toward the light radiation surface from the bottom surface, the first inclined surface capable of reflecting light from the first light emitting element toward the light radiation surface, and a second inclined surface is formed on the bottom surface of the light guide plate and is inclined toward the light radiation surface from the bottom surface, the second inclined surface capable of reflecting light from the second light emitting element toward the light radiation surface, and wherein the first inclined surface and the bottom surface are contacted with each other at a first tangent line, the first tangent line being orthogonal to a straight line drawn to the first inclined surface from the first light emitting element, the second inclined surface and the bottom surface are contacted with each other at a second tangent line, the second tangent line being orthogonal to a straight line drawn to the second inclined surface from the second light emitting element, the first inclined surface and the second inclined surface are contacted with each other so as to form two sides of each pyramid, and a line at which the first inclined surface and the second inclined surface are contacted with each other is inclined with respect to the bottom surface, and wherein a size of the first inclined surface and a size of the second inclined surface increase as a distance from the first light source element and the second source element increases.

6. A liquid crystal display device according to claim 5, wherein inclined angles of the first inclined surface and the second inclined surface are set to values which fall within a range of 55°±10° with respect to the bottom surface of the light guide plate.

* * * * *